(12) United States Patent
Ohnuki

(10) Patent No.: US 8,539,208 B2
(45) Date of Patent: Sep. 17, 2013

(54) REGISTER FILE HAVING MULTIPLE WINDOWS AND A CURRENT WINDOW POINTER

(75) Inventor: Yoshiteru Ohnuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/017,665

(22) Filed: Jan. 31, 2011

(65) Prior Publication Data

US 2011/0125988 A1 May 26, 2011

Related U.S. Application Data

(63) Continuation of application No. PCT/JP2008/002172, filed on Aug. 8, 2008.

(51) Int. Cl.
*G06F 7/38* (2006.01)
*G06F 9/00* (2006.01)
*G06F 9/44* (2006.01)
*G06F 15/00* (2006.01)

(52) U.S. Cl.
USPC ......................................................... 712/225

(58) Field of Classification Search
None
See application file for complete search history.

(56) References Cited

U.S. PATENT DOCUMENTS

| 5,179,682 A | 1/1993 | Jensen |
| 5,392,411 A | 2/1995 | Ozaki |
| 7,093,110 B2 * | 8/2006 | Okawa et al. ................. 712/228 |
| 7,343,478 B2 * | 3/2008 | Kan et al. ...................... 712/220 |
| 2008/0229080 A1 * | 9/2008 | Kan et al. ...................... 712/221 |

FOREIGN PATENT DOCUMENTS

| EP | 1 768 020 A2 | 3/2007 |
| GB | 2 383 652 A | 7/2003 |
| GB | 2 383 652 A | 9/2003 |
| JP | 5-20010 | 1/1993 |
| JP | 5-282147 | 10/1993 |

OTHER PUBLICATIONS

European Search Report dated Jul. 11, 2011 in corresponding European Patent Application 08790429.8.
Ben J. Catanzaro, "The SPARC Technical Papers", Springer-Verlag, 1991, p. 14, 60-61, 235-237.
Japanese Office Action issued Oct. 23, 2012 in corresponding Japanese Patent Application No. 2010-523656.
Korean Office Action issued Jul. 28, 2012 in corresponding Korean Patent Application No. 10-2011-7002117.
Chinese Office Action issued Mar. 26, 2013 in corresponding Chinese Patent Application No. 200880130631.8.

* cited by examiner

*Primary Examiner* — Corey S Faherty
(74) *Attorney, Agent, or Firm* — Staas & Halsey LLP

(57) ABSTRACT

In an arithmetic processing unit adopting register windows, a configuration is made such that the reading process of a register file is controlled by two stages of a current window selection and a register selection, and the register selected at a plurality of reading ports of the register is set to each port in advance such that it will be out-of-order executable. Accordingly, the process of reading the data into an arithmetic section is possible without having a temporary memory, and an instruction subsequent to a window switching instruction is also out-of-order executable.

3 Claims, 11 Drawing Sheets

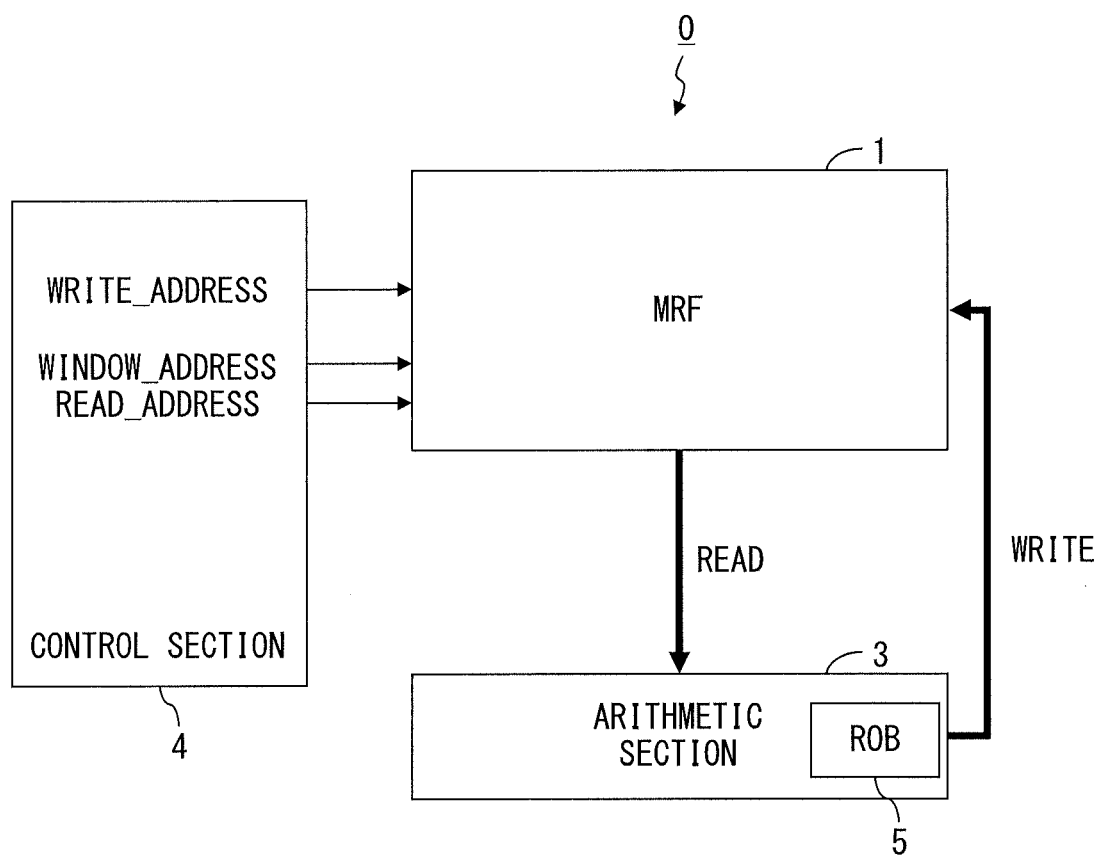
F I G. 3

| W0 local |
|---|
| W0 out |
| W1 local |
| W1 out |
| W2 local |
| W2 out |
| W3 local |
| W3 out |
| W4 local |
| W4 out |
| W5 local |
| W5 out |
| W6 local |
| W6 out |
| W7 local |
| W7 out |

FIG. 5

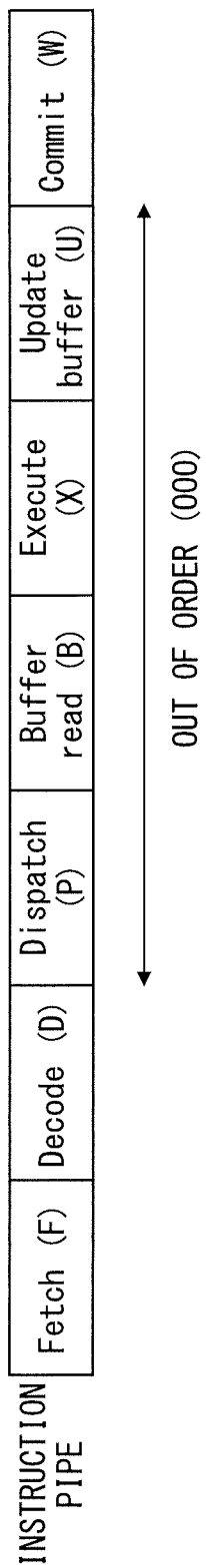
F I G. 6

| CWP | L_PORT0 | L_PORT1 | OUT_PORT0 | OUT_PORT1 | OUT_PORT2 |
|---|---|---|---|---|---|
| 0 | W0 | W7/W1 | W0 | W7 | W6/W1 |
| 1 | W0/W2 | W1 | W0 | W1 | W7/W2 |
| 2 | W2 | W1/W3 | W2 | W1 | W0/W3 |
| 3 | W2/W4 | W3 | W2 | W3 | W1/W4 |
| 4 | W4 | W3/W5 | W4 | W3 | W2/W5 |
| 5 | W4/W6 | W5 | W4 | W5 | W3/W6 |
| 6 | W6 | W5/W7 | W6 | W5 | W4/W7 |
| 7 | W6/W0 | W7 | W6 | W7 | W5/W0 |

FIG. 8

REGISTER FILE HAVING MULTIPLE WINDOWS AND A CURRENT WINDOW POINTER

CROSS-REFERENCE TO RELATED APPLICATIONS

This application is a continuation application of International PCT Application No. PCT/JP 2008/002172, which was filed on Aug. 8, 2008.

FIELD

The present invention relates to an arithmetic processing unit having a register file with register windows. The present invention involves an arithmetic processing unit which achieves the process of high-speed reading from a register without using a temporary memory for the process of high-speed reading from a register file, and the method thereof.

BACKGROUND

Processors of RISC (Reduced Instruction Set Computer) architecture (hereinafter, referred to as "RISC processors") center on a register-register operation, and the acceleration of processing is attempted by reducing the memory access. This is referred to as a load store architecture. RISC processors are provided with a register file having a large capacity for the improvement of the above-mentioned register-register operation. As such a register file, a register file with register windows which is configured to reduce the overhead of passing an argument (saving/restoring of argument) when a subroutine is called is known.

FIG. 1 is a diagram illustrating the configuration of a register file with register windows.

The register file 1000 illustrated in FIG. 1 has one register window "W global" and eight register windows "W0-W7", and the register windows W0-W7 are logically linked in a ring shape. The respective register window Wk(k=0-7) is provided with the three types of segments, "Wk out", "Wk in", and "Wk local". Three types of segments all consist of eight registers. Wk local is provided with the eight local registers unique to the respective register windows. Wk in is provided with eight in-registers, and Wk out is provided with eight out-registers. Further, W global is provided with the eight global registers that are commonly used in all the subroutines.

Wk out is used for passing an argument to the subroutine called by the child routine, and Wk in is used for receiving an argument from the parent routine that called the child routine. A configuration is made in the register file 1000 such that Wk in and Wk+1 out as well as Wk out and Wk-1 in will overlap, and thus when a subroutine is called, the process of passing an argument and securing a register used therefor can be accelerated. Wk local is used by each subroutine, i.e., a child routine called by the parent routine, as a working register set.

Each subroutine uses one of the eight register windows W0-W7 at runtime. Here, the register window Wk used by the currently running subroutine (referred to as "current window") is configured to rotate by two segments in a clockwise direction (the direction indicated by the broken-line arrow labeled "SAVE") every time a subroutine call is caused, and to rotate by two segments in a counter-clockwise direction (the direction indicated by the broken-line arrow labeled "RESTORE") when a subroutine is restored.

In the register file 1000, each register window Wk is managed with the respectively assigned register window number (hereinafter, referred to as "window number"). A window number "k" is assigned to register window Wk. The window number k of the register window Wk being used by the currently running subroutine is held by a CWP (Current Window Pointer). The value of a CWP is incremented by an execution of a SAVE instruction or by an occurrence of a trap, and is decremented by an execution of a RESTORE instruction or by a restoration from a trap by a RETT instruction. In FIG. 1, the value of the CWP is "0", and the CWP points at the resister window W0. The instructions for switching the current window by incrementing/decrementing the value of a CWP, as described above, are referred to as "window switching instruction" in the present specification.

The register file 1000 illustrated in FIG. 1 has one window W global. The W global is a register set that stores the data shared in all the routines.

Each register window Wk is provided with 24(=8*3) registers, and the register window W global is provided with eight registers. Among those registers, 64(=8*8) registers of Wk in and Wk out overlap, and thus the total number of registers provided for the register file 1000 is 136(=24*8+8−64). In order for the functional unit of the processor to run a subroutine, it is necessary for the functional unit to be capable of reading and writing the data from/to all the registers of the register file 1000.

In such cases, the scale and speed of the circuit that reads the data from such a large register file 1000 becomes a problem. In order to solve this problem, the arithmetic processing unit as illustrated in FIG. 2 has been designed.

The arithmetic processing unit 2000 illustrated in FIG. 2 is comprised of a master register file 2001 (hereinafter, referred to as "MRF"), a working register file 2002 (hereinafter, referred to as "WRF"), an arithmetic section 2003, and a control section 2004.

Generally, a register file with register windows involves a larger number of registers as the number of the register windows increases, and it becomes accordingly difficult to provide an operand to the functional unit at high speed. For this reason, in addition to the MRF 2001 that is a register file for holding all the windows, the WRF 2002 is provided as a subset of the MRF 2001 for holding a copy of one of the windows of the MRF 2001 indicated by the pointer CWP, and this WRF 2002 performs the data reading. The WRF 2002 only holds the copy of the window indicated by the pointer. As the WRF 2001 is small compared with the MRF 2001, when the WRF 2001 reads the data depending on the provided READ_ADDRESS, which is the address of readout from the control section 2004, the process of data reading can be accelerated.

The arithmetic section 2003 is provided with the rename register ROB 2005 for the MRF 2001, and renames the computational result. Further, a write-back of the computational result is performed from the ROB 2005 to the MRF 2001 and the WRF 2002 when committed.

As described above, an arithmetic processing unit as illustrated in FIG. 2 has been designed; however, in such a configuration, there is a hardware cost due to the configuration in which a subset of the MRF is provided for holding the copy of one of the windows of the MRF. Furthermore, electric power is consumed due to the data transfer between the MRF and the WRF.

When a processor is provided with an out-of-order executive function, the order of executing the instructions is not necessarily in accordance with the program order, and the processable instructions are executed first. Therefore, it is also desired to achieve the configuration of swapping the execution order in which the register window switching instruction is passed.

Patent Document 1
Japanese Laid-open Patent Publication No. 5-282147 "Register File"

SUMMARY

It is an object of the present invention, in an arithmetic processing unit adopting register windows, to reduce the hardware cost associated with the process of reading registers, and to eliminate the power consumption associated with the data transfer between working buffers or between buffers. Moreover, for the arithmetic processing units provided with an out-of-order executive function, it is necessary to achieve the configuration of swapping the execution order in which the register window switching instruction is passed.

In the present invention, the MRF is configured such that the reading process is controlled by two stages, a current window selection and a register selection. Further, the register selected at a reading port of the register is set to each port in advance such that it will be out-of-order executable. Accordingly, the process of reading the data into the arithmetic section at high speed is possible without having the WRF as a temporary memory, and an instruction subsequent to a window switching instruction is also out-of-order executable.

According to the present invention, the hardware cost of a WRF can be reduced while the conventionally achieved performance is almost maintained. Further, a reduction in power consumption due to the configuration in which a WRF is not used and a reduction in power consumption due to the configuration in which there is no MRF-WRF data transfer can also be achieved.

BRIEF DESCRIPTION OF DRAWINGS

FIG. 3 is a diagram illustrating a configuration of an arithmetic processing unit adopting register windows according to the embodiment of the present invention.

FIG. 5 is a diagram illustrating an improved configuration example of a register window system.

FIG. 6 is a diagram illustrating the points at which out-of-order processing is performed in a pipeline.

FIG. 8 is a diagram illustrating the assignment of ports for the process of reading.

DESCRIPTION OF EMBODIMENTS

Hereinafter, an embodiment of the present invention in which the process of high-speed reading from a register file is achieved in an arithmetic processing unit having a register file with register windows will be described with reference to the drawings.

FIG. 3 illustrates a configuration of an arithmetic processing unit adopting register windows according to the present embodiment.

Figure 2:
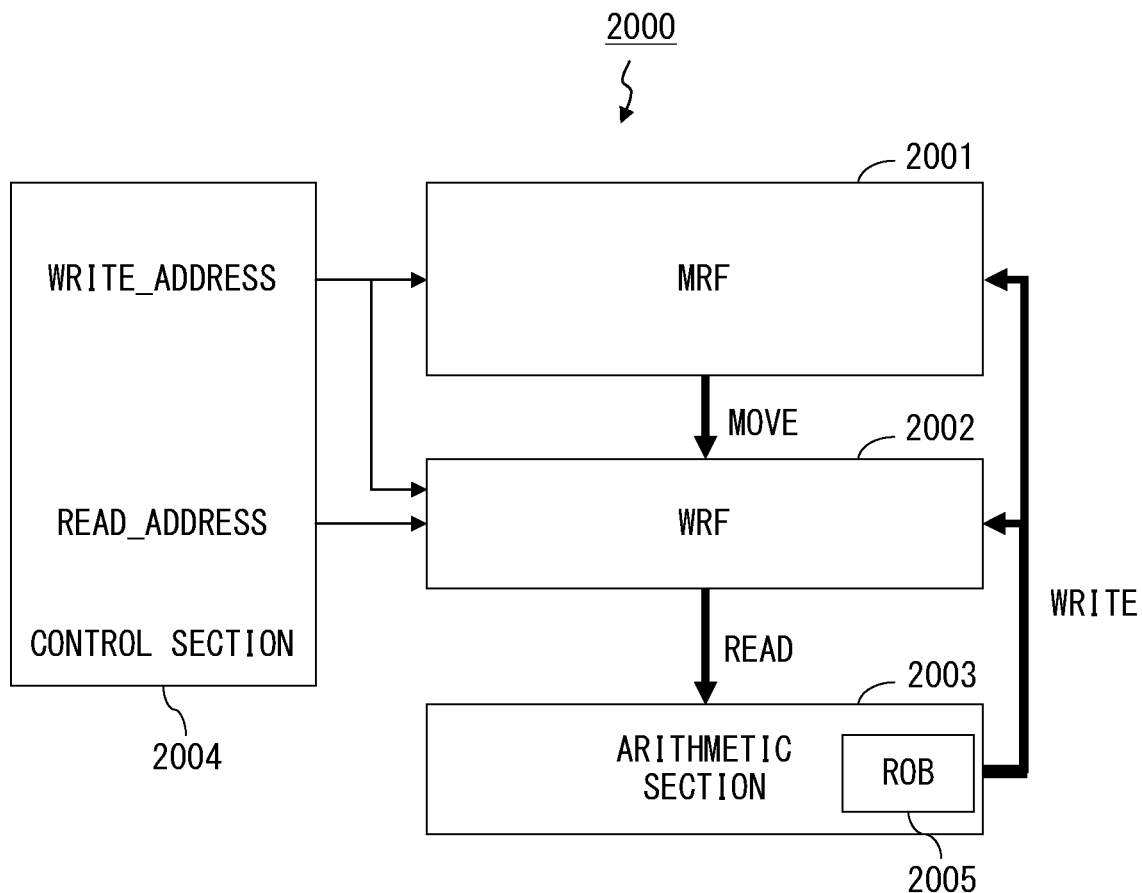
FIG. 2 is a diagram illustrating a conventional configuration example of an arithmetic processing unit adopting register windows.

An arithmetic processing unit 0 is provided with a master register file (MRF) 1, arithmetic section 3, and a control section 4. Compared with the arithmetic processing unit 2000 of FIG. 2, the arithmetic processing unit 0 illustrated in FIG. 3 does not include the WRF 2002 as a temporary memory. A ROB (rename register) 5 provided for the arithmetic section 3 performs the renaming of the computational result, and performs a write-back of the computational result to the MRF 1 when committed (WRITE).

In FIG. 3, the reading process of the MRF 1 is controlled by the two stages of a current window selection and a register selection. The process of selecting a current window is controlled by a WINDOW_ADDRESS signal output from a control section 4. The WINDOW_ADDRESS signal is based on a value of a CWP (Current Window Pointer). Moreover, the process of selecting a register is controlled by a READ_ADDRESS signal output from the control section 4.

Furthermore, as will be described later, a configuration is made in advance such that the registers selected by register reading ports are out-of-order executable. Accordingly, in the present embodiment, the process of reading the data into the arithmetic section 3 at high speed is possible without having a temporary memory, and an instruction subsequent to a SAVE instruction and a RESTORE instruction is out-of-order executable.

As described above, in the present embodiment, a WRF is not necessary, and thus the hardware cost thereof can be reduced. Further, the reduction in power consumption due to the configuration in which a WRF is not used and the reduction in power consumption due to the configuration in which there is no MRF-WRF data transfer can also be achieved.

Hereinafter, the configuration of the arithmetic processing unit 0 will be described in detail.

Figure 1:
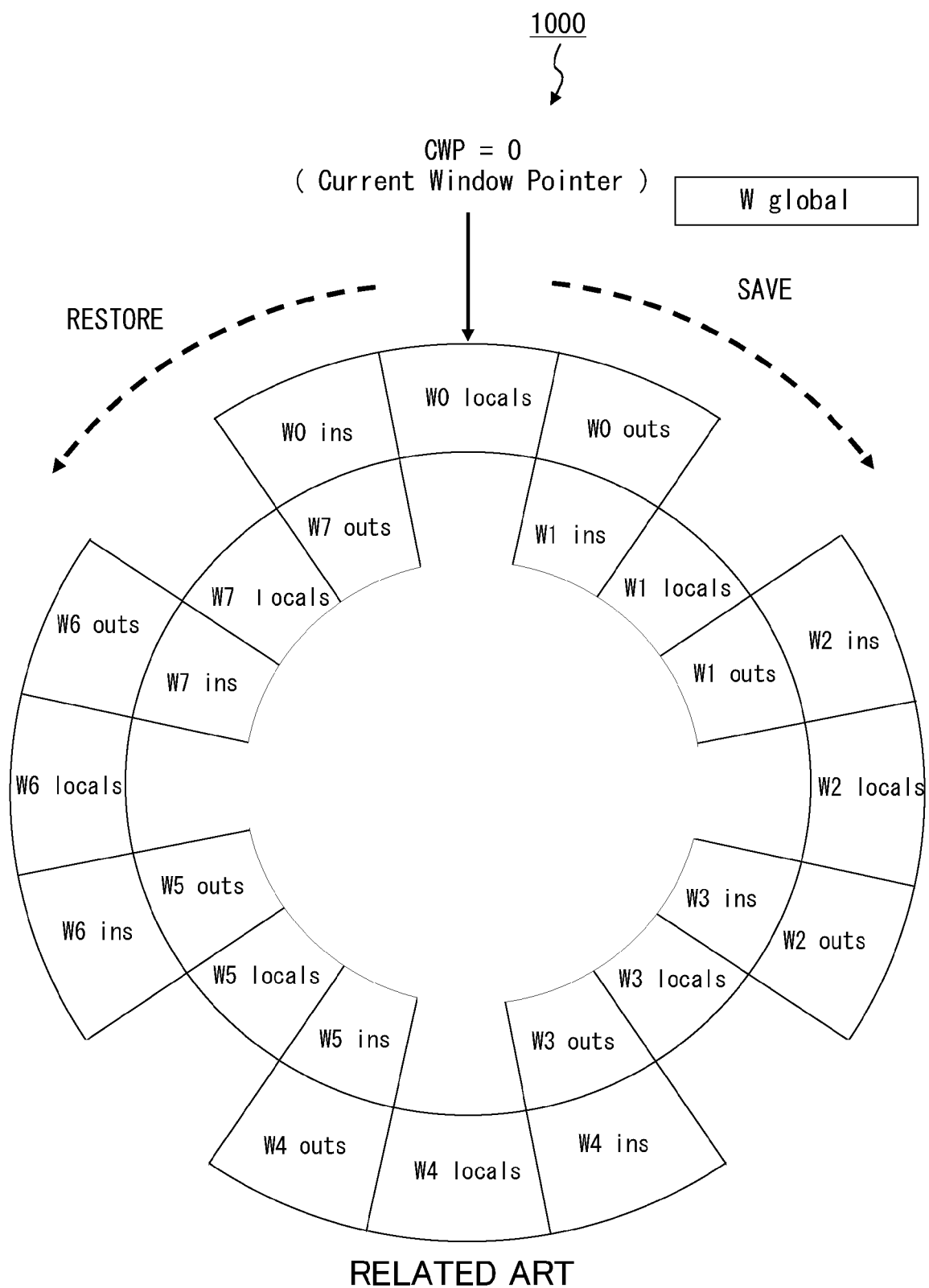
FIG. 1 is a diagram illustrating a configuration example of a register file with register windows.

As illustrated in FIG. 1, the MRF 1 is provided with eight windows each of which has Wk local, Wk in, and Wk out (k=0-7), and each of Wk local, Wk in, and Wk out has eight registers. Moreover, the MRF 1 is also provided with W global having eight registers, independently from the registers in the eight windows each of Wk local, Wk in, and Wk out. The W global registers are commonly used in all the windows, and thus do not influence the window switching; therefore, the W global registers will not be further described in the following.

Figure 4:
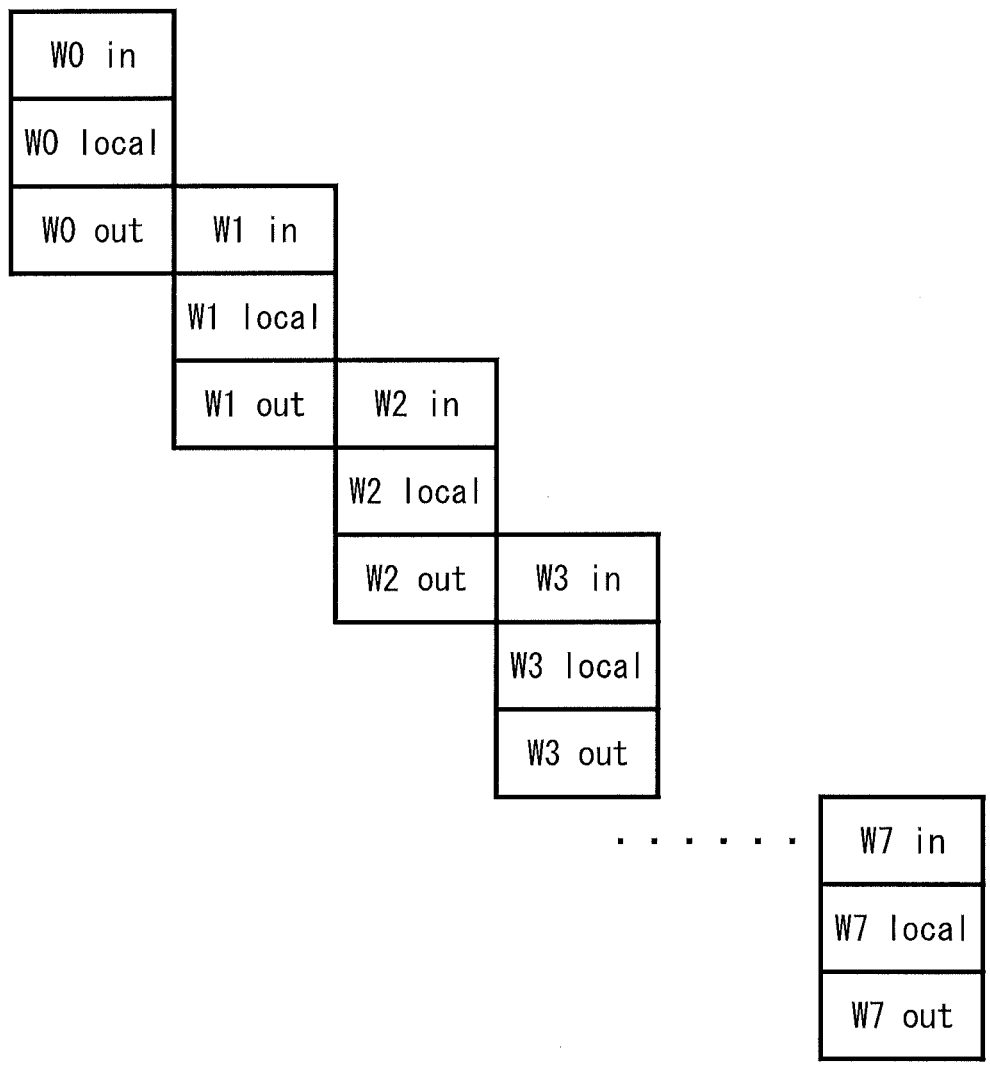
FIG. 4 is a diagram illustrating the general configuration of a register window system.

FIG. 4 illustrates the configuration of register windows. One of the features of the register windows is that, for example, W1 in of k=1 is the same as W0 out of k=0. Accordingly, in the present embodiment, Wk in registers are not implemented, and only Wk local registers and Wk out registers are implemented, as illustrated in FIG. 5.

FIG. 6 illustrates the points at which out-of-order processing is performed when an instruction is pipeline processed. As illustrated in FIG. 6, when an instruction is executed, the processes of Fetch (F), Decode (D), Dispatch (P), Buffer read (B), Execute (X), Update buffer (U), and Commit (W) are respectively performed. As illustrated in FIG. 6, out-of-order processing (OOO) is performed at Dispatch (P), Buffer Read (B), Execute (X), and Update Buffer (U).

Figure 7:
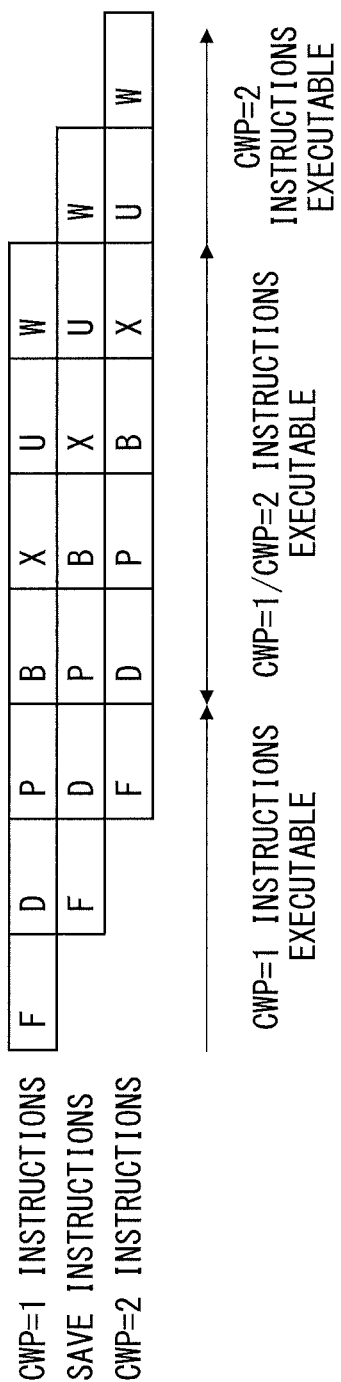
FIG. 7 is a diagram illustrating an example of an instruction execution pipeline before and after a SAVE instruction.

FIG. 7 illustrates the relationship between the instructions when an instruction of CWP=1, a SAVE instruction, and an instruction of CWP=2 subsequent to the instruction of CWP=1 are out-of-order executed. As illustrated in FIG. 7, in order to perform out-of-order execution, both the register group corresponding to the current CWP (in FIG. 7, CWP=1) and the register group corresponding to the next CWP after the current CWP (in FIG. 7, CWP=2) must be readable while the SAVE instruction is being substantially executed, i.e., while the processing from Dispatch (indicated by "P") to Update buffer (indicated by "U") among the processes performed in the SAVE instruction is being executed.

More specifically, the register group read due to the instruction of CWP=1 consists of W global, W1 local, W1 out, and W1 in (W0 out), and the register group read due to the instruction of CWP=2 consists of W global, W2 local, W2 out, and W2 in (W1 out). Accordingly, in order to perform out-of-order execution of an instruction subsequent to the SAVE instruction, the register group of W global, W2 local, W2 out, W1 local, W1 out, and W0 out must be readable.

Moreover, when a RESTORE instruction is executed instead of the SAVE instruction in order to perform out-of-order execution of the instruction of CWP=1, the RESTORE instruction, and the subsequent instruction of CWP=0 in a similar manner as in FIG. 7, both the register group read due to the instruction of CWP=1 consisting of W global, W1 local, W1 out, and W1 in (W0 out) and the register group read due to the instruction of CWP=0 consisting of W global, W0 local, W0 out, and W0 in (W7 out) must be readable. In other words, under these circumstances, W global, W1 local, W1 out, W0 local, W0 out, and W7 out must be readable.

Considering the above, in order to enable the out-of-order execution, it is to be understood that six ports are required as the ports of the first stage for reading the register from the MRF 1. Hereinafter, these ports are referred to as G_PORT (global), L_PORT0, L_PORT1, OUT_PORT0, OUT_PORT1, and OUT_PORT2. The group of global registers, the group of local registers, and the group of out-registers are assigned to G_PORT, L_PORT, and OUT_PORT, respectively.

For example, when the SAVE instruction subsequent to the instruction of CWP=1 is executed, the W global register group, W2 local register group, W1 local register group, W0 out register group, W1 out register group, and W2 out register group are assigned to G_PORT, L_PORT0, L_PORT1, OUT_PORT0, OUT_PORT1, and OUT_PORT2, respectively.

Summarizing the above, the register groups for reading correspond to each port depending on the value of the CWP, as shown in FIG. 8.

In FIG. 8, for example, a notation divided by a forward slash such as "W7/W1" indicates that the "W7" register group is assigned when out-of-order execution is performed while a RESTORE instruction is being executed, and that the "W1" register group is assigned when out-of-order execution is performed while a SAVE instruction is being executed.

In FIG. 8, as an example, the out-of-order execution when the current CWP is CWP=0 and a RESTORE instruction is subsequently executed is described as follows. As the local register groups are assigned to L_PORT0 and L_PORT1, the local register groups of W0 local and W7 local are assigned thereto, respectively. Moreover, as the out-register groups are assigned to OUT_PORT0, OUT_PORT1, and OUT_PORT2, the out-register groups of W0 out, W7 out, and W6 out are assigned thereto, respectively.

On the other hand, as an example, the out-of-order execution when the current CWP is CWP=0 and a SAVE instruction is subsequently executed is described as follows. The local register groups of W0 local and W1 local are respectively assigned to L_PORT0 and L_PORT1, and the out-register groups of W0 out, W7 out, and W1 out are respectively assigned to OUT_PORT0, OUT_PORT1, and OUT_PORT2.

Accordingly, at the current window selection as the first stage for reading the register from the MRF 1, the registers selected by the register reading ports based on a WINDOW_ADDRESS signal can be assigned based on the operation algorithms that are shown below as rules 1-6. Note that it is assumed that there are 0, 1, 2, ..., 2n, 2n+1 register windows ("n" is an arbitrary natural number). Moreover, the CWP next to CWP=2n+1 (i.e., CWP=2n+2) returns to CWP=0.

Rule 1 CWP=2n (except when SAVE•RESTORE instruction is being executed):
  L_PORT0=W2n local
  L_PORT1=*(meaning "don't care")
  OUT_PORT0=W2n out
  OUT_PORT1=W(2n−1) out
  OUT_PORT2=*(meaning "don't care")

Rule 2 CWP=2n+1 (except when SAVE•RESTORE instruction is being executed):
  L_PORT0=*(meaning "don't care")
  L_PORT1=W(2n+1) local
  OUT_PORT0=W2n out
  OUT_PORT1=WP(2n+1) out
  OUT_PORT2=*(meaning "don't care")

Rule 3 CWP=2n (when SAVE instruction is being executed):
  L_PORT0=W2n local
  L_PORT1=W(2n+1) local
  OUT_PORT0=W2n out
  OUT_PORT1=W(2n−1) out
  OUT_PORT2=W(2n+1) out Rule 4 CWP=2n+1 (when SAVE instruction is being executed):
  L_PORT0=W(2n+2) local
  L_PORT1=W(2n+1) local
  OUT_PORT0=W2n out
  OUT_PORT1=W(2n+1) out
  OUT_PORT2=W(2n+2) out Rule 5 CWP=2n (when RESTORE instruction is being executed):
  L_PORT0=W2n local
  L_PORT1=W(2n−1) local
  OUT_PORT0=W2n out
  OUT_PORT1=W(2n−1) out
  OUT_PORT2=W(2n−2) out Rule 6 CWP=2n+1 (when RESTORE instruction is being executed):
  L_PORT0=W2n local
  L_PORT1=W(2n+1) local
  OUT_PORT0=W2n out
  OUT_PORT1=W(2n+1) out
  OUT_PORT2=W(2n−2) out In accordance with rules 1-6 above, one register from the register groups of W(2n) local is selected for L_PORT0 and one register from the register groups of W(2n+1) local is selected for L_PORT1 in the process of reading at each port. Moreover, it is to be understood that one register from the register groups of W(2n) out is selected for O_PORT0, one register from the register groups of W(2n+1) out is selected for O_PORT1, and one register from the register groups of W(2n) out or W(2n+1) out is selected for O_PORT2. Then, at the register reading ports, the registers to be read are selected depending on a WINDOW_ADDRESS signal based on a value of the CWP and whether or not a SAVE instruction and a RESTORE instruction are being executed.

Figure 9:
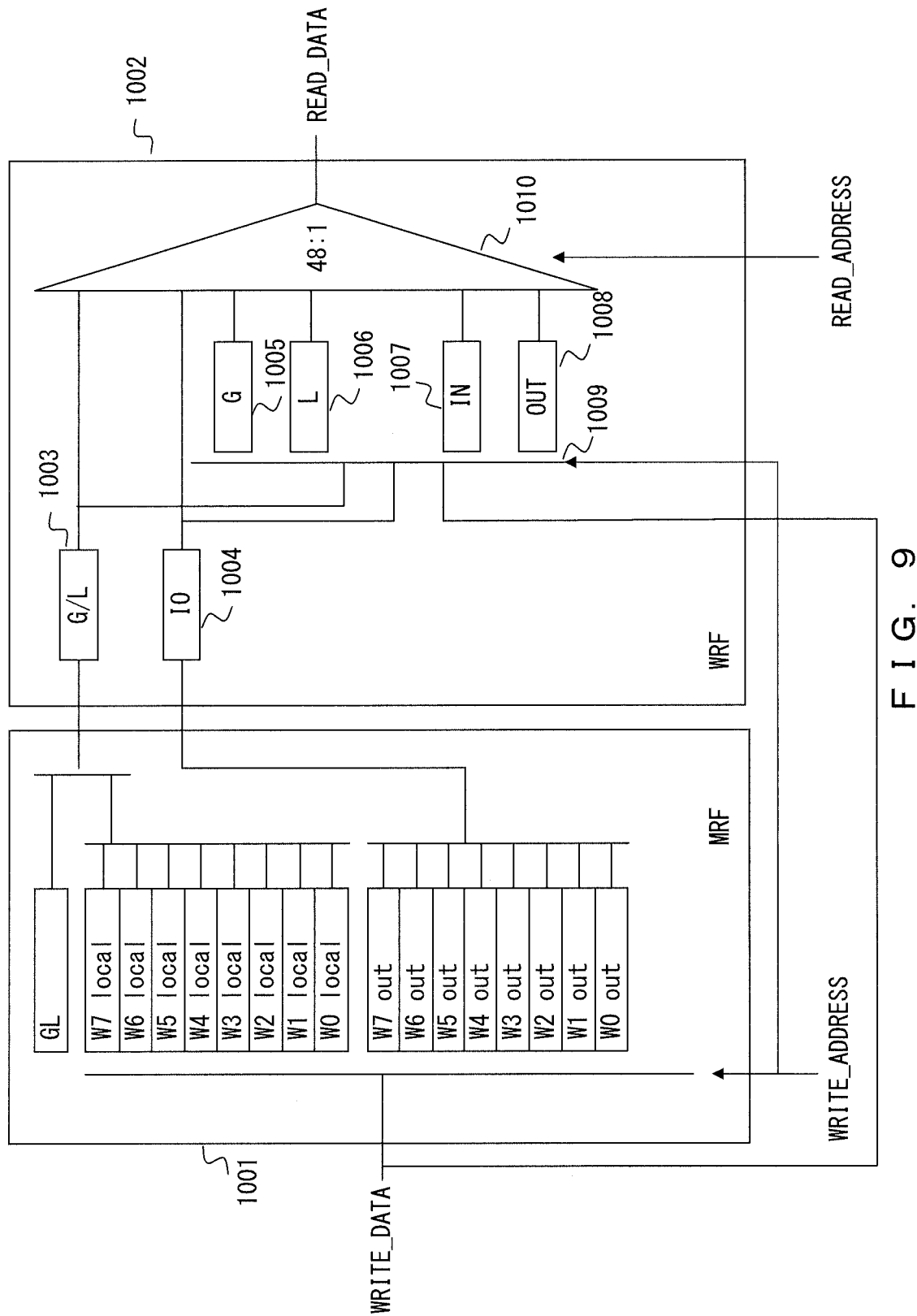
FIG. 9 is a diagram illustrating a specific configuration example of the conventional register window system.
Figure 10:
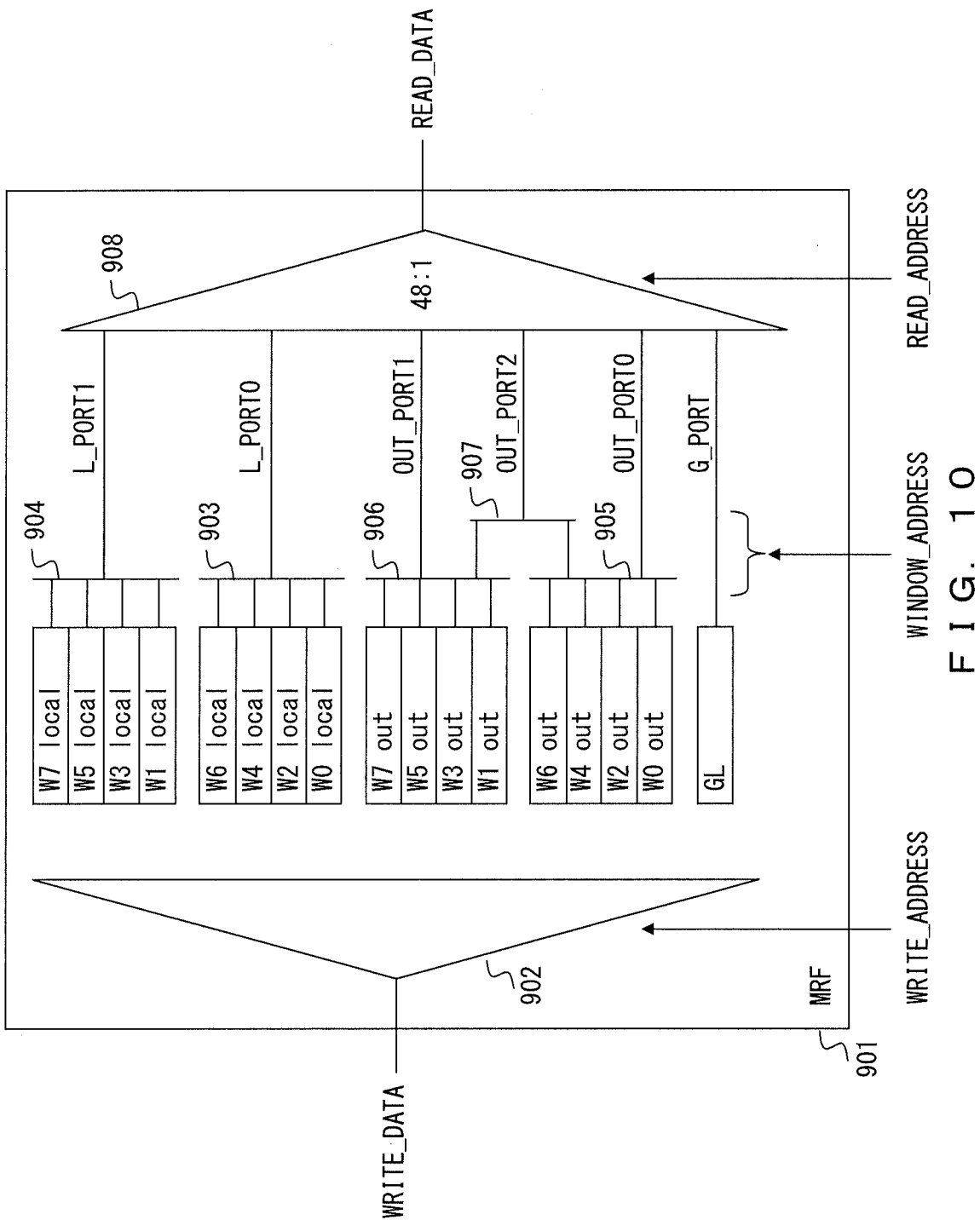
FIG. 10 is a diagram illustrating a specific configuration example of the register window system according to the embodiment of the present invention.

A specific configuration of the present embodiment based on the above-mentioned principle of the register assignment will be described below in comparison to the conventional configuration. FIG. 10 is a diagram illustrating a configuration example of the register window system of the arithmetic processing unit 0 of FIG. 3 according to the present embodiment. FIG. 9 is a diagram illustrating a configuration example of the conventional register window system.

In the configuration example of the register window system according to the present embodiment as illustrated in FIG. 10, from the groups of eight registers output from the four local register groups W0 local, W2 local, W4 local, and W6 local, one group is selected by a selector 904, and is output to L_PORT0 port.

From the groups of eight registers output from the four local register groups W1 local, W3 local, W5 local, and W7 local, one group is selected by a selector 905, and is output to L_PORT1 port.

From the groups of eight registers output from the four local register groups W0 out, W2 out, W4 out, and W6 out, one group is selected by the selector 905, and is output to OUT_PORT0 port. Further, one group is selected by the selector 905 and a selector 907, and is output to OUT_PORT2 port.

From the groups of eight registers output from the four local register groups W1 out, W3 out, W5 out, and W7 out, one group is selected by a selector 906, and is output to OUT_PORT1 port. Further, one group is selected by the selector 906 and the selector 907, and is output to the OUT_PORT2 port.

The group of eight registers output from the global register group illustrated as GL is output to G_PORT port.

From the values of the total of forty-eight registers (8*6=48) output to the six ports L_PORT0, L_PORT1, OUT_PORT0, OUT_PORT1, OUT_PORT2, and G_PORT, each of which includes eight registers, one register value is selected by a selector 908, and is output as READ_DATA (reading data). The ratio "48:1" in the selector 908 indicates that one register value is selected from forty-eight registers and is then output.

In the register window system of the present embodiment as illustrated in FIG. 10, depending on a WINDOW_ADDRESS signal based on a value of the CWP and the execution status of a SAVE instruction or a RESTORE instruction being executed, a configuration is made such that selectors 903-907 can select an output from the register groups in accordance with the above-mentioned operation algorithm of rules 1-6. This operation algorithm can be configured by a simple logic circuit. Moreover, the READ_ADDRESS signal to be provided to the selector 908 may be a signal for selecting one register value from the forty-eight registers. A WRITE_ADDRESS signal controls a selector 902 to write WRITE_DATA (writing data) into each of the register groups.

As described above, in the present embodiment, if the WINDOW_ADDRESS signal or the data stored in an MRF 901 is unchanged, the process of reading data can be performed at a high speed by simple addressing with the WINDOW_ADDRESS signal and READ_ADDRESS signal. Compared with the conventional configuration, as will be described later with reference to FIG. 9, a working register file (WRF) is not necessary and thus the volume of hardware can be reduced. It may be configured that if the WINDOW_ADDRESS signal or the data stored in the MRF 901 is changed, the data is read from a ROB 5 of FIG. 3.

Next, in a configuration example of the conventional register window system of FIG. 9, a master register file (MRF) 1001 has the groups of eight local registers shown as "W0 local-W7 local", the groups of eight out-registers shown as "W0 out-W7 out", and the global register group shown as "GL". The group of eight in-registers of "W0 in-W7 in" are shared with the groups of eight out-registers of "W7 out" and "W0 out-W6 out", respectively.

On the other hand, a working register file (WRF) 1002 includes a G register group 1005, an L register group 1006, an IN register group 1007, and an OUT register group 1008 that respectively hold the eight register values of one selected group of global registers, the eight register values of one selected group of local registers, the eight register values of one selected group of in-registers (=out-registers), and the eight register values of one selected group of out-registers, each of which is output from the MRF 1001 at a value of the CWP of the MRF 1001; a G/L register group 1003 for temporarily holding the output values of the current eight registers of one register of local register groups "W0 local-W7 local" or global register group "GL" from the MRF 1001; an IO register group 1004 for temporarily holding the output values of the current eight registers of one register of out-register groups "W0 out-W7 out" from the MRF 1001, in a similar manner; a selector 1009 for making a selection from the G/L register group 1003, IO register group 1004, or WRITE_DATA (writing data) such that the register groups of 1005-1008 will hold; and a selector 1001 for selecting one register value from the six register groups of register group 1003-1008, i.e., the register groups of forty-eight registers (6*8=48), to output the selected register value as READ_DATA (reading data). The ratio "48:1" in the selector 1010 indicates that one register is selected from forty-eight registers.

In the conventional register window system of FIG. 9 as described above, as for the reading process, after output from the register groups in the MRF 1001, the reading data corresponding to the value of the current CWP in the MRF 1001 travels through the G/L register group 1003 and the TO register group 1004 as well as the selector 1009, and is always held at the register groups 1005-1008 in the WRF 1002. As for the writing process, the current writing data in the MRF 1001 travels through the selector 1009 in the MRF 1001, and is held at the register groups 1005-1008 in the WRF 1002. Accordingly, only by providing the address signal that selects one of the register groups 1005-1008 or the register groups 1003 and 1004 to the selector 1010 as READ_ADDRESS can the data indicated by the current CWP be read at high speed as READ_DATA. Moreover, in view of out-of-order execution, etc., the selector 1010 is configured such that the outputs of the register groups 1003 and 1004 that are the current outputs of the MRF 1001 can be selected.

In the configuration example of the conventional register window system of FIG. 9, the WRF 1002 is provided in addition to the MRF 1001, and thereby the process of reading data at high speed is achieved. However, as discussed above, there is a problem in that the hardware configuration becomes large due to the WRF 1002.

Comparing the configuration according to the present embodiment as shown in FIG. 10 with the conventional configuration as shown in FIG. 9 in view of the above discussion, the superiority of the present embodiment should be apparent.

Up to now, the configuration of the arithmetic processing unit 0 according to the present embodiment has been described in detail. As discussed above, in the arithmetic processing unit 0 according to the present embodiment, the process of reading of the MRF 1 of FIG. 3 is controlled by two stages of a current window selection (WINDOW_ADDRESS) based on the value of the CWP, i.e., the number of the current window, and a reading register selection based on the READ_ADDRESS corresponding to the reading address. In the current window selection, the registers are selected according to a first local register reading port (L_PORT0) in which registers are selected from the local register groups whose window numbers are even based on the current window number, a second local register reading port (L_PORT1) in which registers are selected from the local register groups whose window numbers are odd based on the current window number, a first out-register reading port (OUT_PORT0) in which registers are selected from the out-register groups whose window numbers are even based on the current window number, a second out-register reading port (OUT_PORT1) in which registers are selected from the out-register groups whose window numbers are odd based on the current window number, and a third out-register reading port (OUT_PORT2) in which registers are selected from the out-register groups based on the current window number.

Due to the above-described configuration, in the arithmetic processing unit according to the present embodiment, the process of reading from a register at high speed is realized without using a WRF as temporary memory, and an instruction subsequent to the window switching instruction is out-of-order executable.

Accordingly, the hardware cost of the WRF can be reduced. Further, the reduction in power consumption due to the configuration in which a WRF is not used and the reduction in power consumption due to the configuration in which there is no MRF-WRF data transfer can also be achieved.

In the above, an example of the present embodiment is described with reference to the drawings, but the present invention may be configured as an information processing unit that is provided with the above-described arithmetic processing unit.

Figure 11:
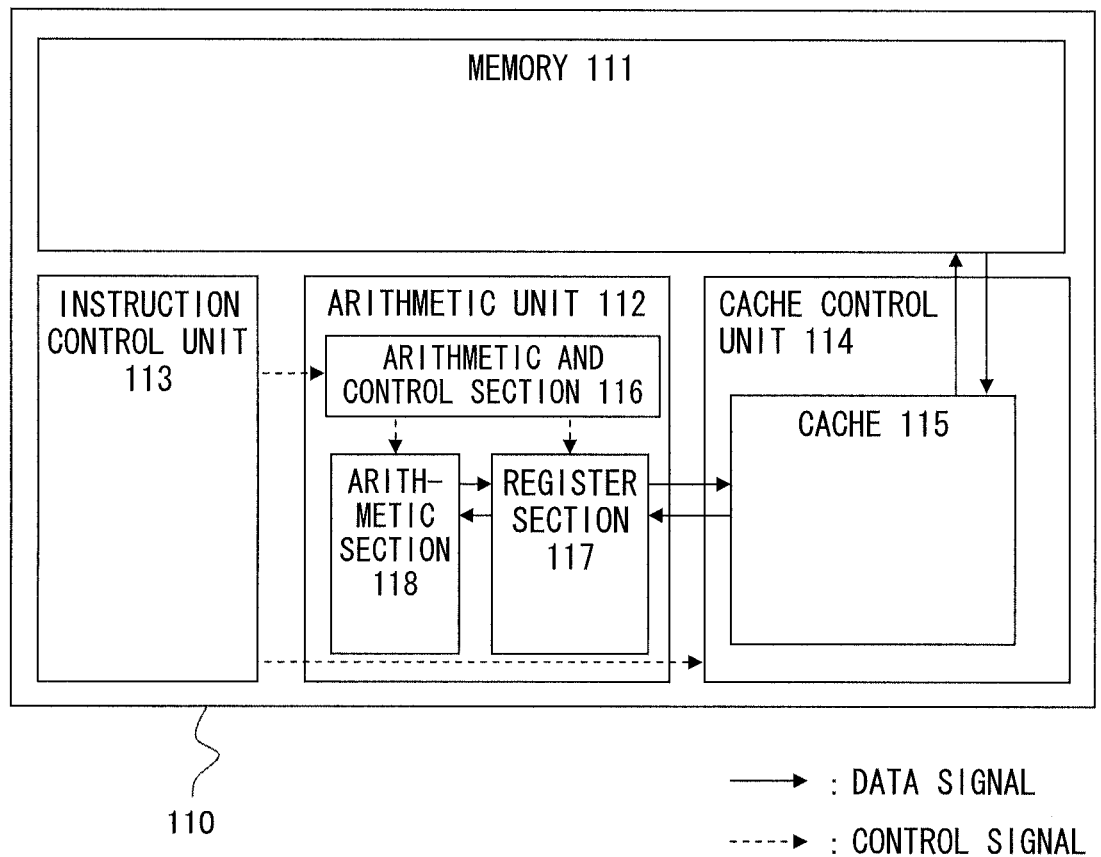
FIG. 11 is a diagram illustrating a configuration of the information processing unit according to the embodiment of the present invention.

FIG. 11 illustrates a configuration example of such an information processing unit. An information processing unit 110 is provided with an arithmetic unit 112, a memory 111, an instruction control unit 113, and a cache control unit 114 having a cache 115. The above-described arithmetic processing unit 0 corresponds to the arithmetic unit 112. The control section 4, the arithmetic section 3, and the MRF 1 shown in FIG. 3 correspond to an arithmetic and control section 116, an arithmetic section 118, and a register section 117, respectively.

In the information processing unit 110, the above-described arithmetic processing unit 0 is adopted and integrated, and thus the hardware cost and the power consumption can be reduced.

An embodiment of the present invention is described in detail in the above, but it should be understood that the present invention is not limited to this embodiment, and the present invention may be modified to various configurations or shapes without departing from the spirit and scope of the invention.

What is claimed is:

1. An arithmetic processing unit comprising:
an arithmetic section configured to perform arithmetic processing;
a register file including
K number of windows each of which has N number of registers including a shared register that is shared by a neighboring window, and is used for passing an argument when calling a subroutine,
a current window selecting unit configured to select, when a register value is read from the register file, a current window from the K number of windows according to a window address information that is output from a control section and is based on a value of a current window pointer, and
a register selecting unit configured to select a reading register via a reading address; and the control section configured to output the window address information for the current window selecting unit of the register file to select a window, wherein the current window selecting unit comprises:
a first local register reading port configured to select a register based on the window address information from local registers in local register groups whose window number is even, the local registers being working registers of the subroutine;
a second local register reading port configured to select a register based on the window address information from local registers in local register groups whose window number is odd, the local registers being working registers of the subroutine;
a first out-register reading port configured to select a register based on the window address information from out-registers in out-register groups whose window number is even, the out-registers being used for passing an argument when the subroutine is called;
a second out-register reading port configured to select a register based on the window address information from out-registers in out-register groups whose window number is odd, the out-registers being used for passing an argument when the subroutine is called; and
a third out-register reading port configured to select a register based on the window address information from out-registers in out-register groups used for passing an argument when the subroutine is called.

2. An information processing unit having an arithmetic processing unit, the arithmetic processing unit comprising:
an arithmetic section configured to perform arithmetic processing;
a register file including
a plurality of registers, wherein the register file is divided into K number of windows each of which has N number of registers, each of the windows shares some of the registers with the windows which neighbor on both side, and the register file comprises a register window configured such that the shared registers are used for passing an argument when calling a subroutine,
a current window selecting unit configured to select, when a register value is read from the register file, a current window from the K number of windows according to a window address information that is output from a control section and is based on a value of a current window pointer, and
a register selecting unit configured to select a reading register via a reading address; and
the control section configured to output the window address information for the current window selecting unit of the register file to select a window, wherein the current window selecting unit comprises:
a first local register reading port configured to select a register based on the window address information from local registers in local register groups whose window number is even, the local registers being working registers of the subroutine;
a second local register reading port configured to select a register based on the window address information from local registers in local register groups whose window number is odd, the local registers being working registers of the subroutine;
a first out-register reading port configured to select a register based on the window address information from out-registers in out-register groups whose window number is even, the out-registers being used for passing an argument when the subroutine is called;

a second out-register reading port configured to select a register based on the window address information from out-registers in out-register groups whose window number is odd, the out-registers being used for passing an argument when the subroutine is called; and a third out-register reading port configured to select a register based on the window address information from out-registers in out-register groups used for passing an argument when the subroutine is called.

3. A method of reading a register file, the register file including a plurality of registers, wherein the register file is divided into K number of windows each of which has N number of registers, each of the windows shares some of the registers with the windows which neighbor on both side, and the register file comprises a register window configured such that the shared registers are used for passing an argument when calling a subroutine, wherein the registers are read by:

selecting, when a register value is read from the register file, a current window from the K number of windows according to a window address information that is output from a control section and is based on a value of a current window pointer; and selecting a reading register from the selected window register based on a reading address, wherein in the selecting the current window, one of the window numbers for identifying each of the K number of windows is selected as a current window number, the method comprising:

selecting a register by a first local register reading port based on the current window number from local registers in local register groups whose window number is even, the local registers being working registers of the subroutine;

selecting a register by a second local register reading port based on the current window number from local registers in local register groups whose window number is odd, the local registers being working registers of the subroutine;

selecting a register by a first out-register reading port based on the current window number from out-registers in out-register groups whose window number is even, the out-registers being used for passing an argument when the subroutine is called;

selecting a register by a second out-register reading port based on the current window number from out-registers in out-register groups whose window number is odd, the out-registers being used for passing an argument when the subroutine is called; and selecting a register based on the current window number from out-registers in out-register groups used for passing an argument when the subroutine is called.

* * * * *